United States Patent [19]
Leo et al.

[11] Patent Number: 4,713,524
[45] Date of Patent: Dec. 15, 1987

[54] PTC FUEL HEATER FOR HEATING ALCOHOL FUEL

[75] Inventors: Vincent B. Leo, Raymond; Kenneth M. Cyll, W. Buxton; Mason G. Ide, Gorham, all of Me.

[73] Assignee: GTE Products Corporation, Stamford, Conn.

[21] Appl. No.: 855,547

[22] Filed: Apr. 21, 1986

[51] Int. Cl.⁴ .................. H05B 3/82; F24H 1/10; F02M 31/12
[52] U.S. Cl. .................. 219/307; 123/549; 123/557; 219/205; 219/298; 219/374; 219/376; 219/382; 219/505; 219/539; 219/541; 338/22 R; 338/54; 338/205; 338/328
[58] Field of Search .................. 219/205–207, 219/381, 382, 375, 376, 374, 365, 306, 307, 298, 504, 505, 540, 541, 530, 539; 338/22 R, 204, 205, 54, 328; 123/549, 557

[56] References Cited

U.S. PATENT DOCUMENTS

| | | | |
|---|---|---|---|
| 4,177,778 | 12/1979 | Naijou et al. | 219/207 X |
| 4,303,050 | 12/1981 | Platzer | 123/549 |
| 4,345,141 | 8/1982 | Little | 123/549 X |
| 4,448,173 | 5/1984 | Abe et al. | 123/549 |
| 4,450,823 | 5/1984 | Abe et al. | 219/207 X |

FOREIGN PATENT DOCUMENTS

| | | | |
|---|---|---|---|
| 883931 | 7/1953 | Fed. Rep. of Germany | 338/204 |
| 2750686 | 5/1979 | Fed. Rep. of Germany | 219/307 |
| 206661 | 11/1984 | Japan | 123/549 |
| 299036 | 4/1971 | U.S.S.R. | 219/381 |

Primary Examiner—Anthony Bartis
Attorney, Agent, or Firm—James Theodosopoulos

[57] ABSTRACT

A fuel heater for vaporization of an alcohol fuel from a fuel line to an internal combustion engine for delivering vaporous fuel to a carburetor. The fuel heater includes a stack of generally planar foraminous PTC heaters that are arranged in a container having an insulated interior defining a fuel flow path having an inlet and an outlet and are separated from each other by generally flat ring-like conductive spacers with electrically conductive ears having conductor receiving holes therein. Alternate conductive spacers are disposed in two channels in a housing and connected to opposite sides of a power supply whereby said PTC heaters can raise the temperature of the incoming fuel and vaporize it. Alternative ears of the electrically conductive spacers are radially offset from each other whereby one row of ears is disposed in one channel and another row is disposed in the other channel.

5 Claims, 2 Drawing Figures

PTC FUEL HEATER FOR HEATING ALCOHOL FUEL

FIELD OF THE INVENTION

The present invention relates, in general, to fuel heaters and, more particularly, to fuel heaters to raise the temperature of incoming ethyl alcohol fuel for use in internal combustion engines. The fuel heater of the present invention employs positive temperature coefficient (PTC) thermistors as the heat source.

BACKGROUND OF THE INVENTION

Engines that use alcohol fuel are difficult or impossible to start when the ambient temperature falls below about 10° C. In many countries, the high domestic energy costs have forced consumers to switch to ethyl alcohol as an alternative fuel. This is particularly true in countries such as Brazil which have an abundance of sugar cane which is a renewable resource. Fuels such as ethanol have been recognized as suitable energy sources for combustion engines. Operational problems exist, however, and notable among such problems is the fact that ethanol has poor starting and driving characteristics when the ambient temperature is below about 10° C. This results from the high latent heat of vaporization and the low vapor pressure of ethanol when compared with petroleum derived gasolines.

Many different approaches have been used to resolve the cold starting problems of ethanol fueled vehicles. Exemplary of the approaches has been to utilize an auxiliary tank for gasoline in which the gasoline would be used to start and warm up the vehicle. When the vehicle was warm, the fuel tanks would be switched and the alcohol fuel would be fed to the carburetor. Obviously, while the solution is viable, there are many difficulties encountered with using two fuel tanks with a vehicle.

SUMMARY OF THE PRIOR ART

The present invention utilizes a fuel preheater that will raise the temperature of the fuel sufficiently prior to injection into the curburetor to eliminate the problems related to cold weather starting. The use of preheaters for fuels that are to be injected into internal combustion engines is well known to the art. For many years, diesel fuel engines have been plagued with problems relating to cold starting and the maintenance cold engines. Diesel fuel has an inherent tendency to gel in cold temperatures and heaters have been placed between the fuel injectors and the fuel tank to preheat the diesel fuel and reduce this tendency.

The U.S. Pat. No. 4,406,785 to Siefer, is exemplary of a diesel fuel heater in which the gelable diesel fuel is heated to a liquid state to improve engine performance. The disposition of PTC heaters in fuel lines to enhance fuel vaporization has also been disclosed in the U.S. Pat. No. 4,387,690 to Chiavaroli. In the Chiavaroli patent, the disposition of a self-regulating heater comprised of a multi-passaged body of ceramic material is disclosed. The body is mounted in the air-fuel passage so that the air-fuel mixture being furnished to the engine is directed through the multiple passages of the ceramic body and is heated as the mixture is fed to the engine. The heater is disclosed to be particularly useful where the fuel tends to condense upon the walls of the passage in the carburetor during engine startup on a cold day.

Other attempts to preheat the fuel mixture have including the disposition of loops of nickel/chromium alloy wire in a container and arranged to contact the fuel as it passes from the fuel tank to the carburetor. Generally, a stainless steel fuel line supplies the fuel to the bottom of the vaporizer and the fuel flows over the heating coils, is vaporized, and passes out through a tube to the engine intake system.

The U.S. Pat. No. 3,927,300 to Wada, describes a electric heating element which can be used for heating a variety of medias. The heating element is described to be particularly useful for heating air or liquids such as would be encountered with a hair dryer and an air towel, a humidifier or volatilizer. In the Wada Patent, a PTC ceramic heater is disclosed and its controlled temperature is advantageously utilized.

SUMMARY OF THE INVENTION

According to the present invention, we have discovered a heater for heating fuels, especially ethanol based fuels, that is interposed between the fuel tank and the carburetor. The heater of the present invention includes a container that has an electrically inert interior and has an inlet and an oulet for the passage of the fuel through the container. A stack of foraminous PTC heaters is disposed in the container in the flow path of the fuel. A conductive spacer is disposed between each of the PTC heaters in the stack and two other identical conductive spacer are connected to the outsides of the top-most and the bottom-most PTC heater in the stack. Each of these conductive spacers are connected to a power supply. Alternate spacers are connected to opposite sides of the power supply so that opposite sides of the power supply are connected to each of the PTC heaters in the stack. The conductive spacers that are disposed between the PTC heaters serve as the connection from one side of the power supply for the two heaters that are disposed on either side of it.

PTC heaters have been in use for many years. Such heaters offer several operating advantages over conventional resistance heating elements in the heating of fuels. They can be made in a flat shape and are formed, generally, of doped barium titanate ceramics which have a sharp positive temperature coefficient of resistance. The PTC ceramics are designed such that below a critical temperature, the resistance of the ceramic remains at a low value and is essentially constant. When a particular temperature is reached, a crystalline phase change takes place in the ceramic and this abrupt change in crystal structure is accompanied by a sharp increase in the resistance at the crystalline grain boundaries. The result of this crystalline change is an increase in the heater resistance of several orders of magnitude over a very small temperature range. A barium titanate heater with a room temperature resistance of 3.0 ohms will increase to 1,000 ohms or more during the crystalline phase change. The temperature at which the crystalline phase change takes place can be adjusted in the PTC manufacturing process through the use of appropriate chemical additives and can be varied between 60° and 180° C.

When energized with a suitable voltage by applying current to the opposite sides of it, the PTC ceramic rapidly heats up in a predetermined operating temperature and then "locks in" at this temperature. This rapid heating is due to the initial low resistance of the PTC ceramic heater which results in an internal high power of the heater. The "lock in" is due to the abrupt increase in resistance which causes generated power to be reduced until it equals dissipated power. At this point, a thermal equilibrium is achieved and the PTC heater self-regulates itself at that temperature.

In this self-regulating mode, the fuel will continue to be heated at the predetermined temperature as the fuel passes through it. This temperature is adequate to heat or vaporize the fuel sufficiently for use in an engine on cold days.

DESCRIPTION OF THE DRAWINGS

For a fuller understanding of the nature and desired objects of this invention, reference should be made to the following detailed description taking in conjunction with the accompanying drawings wherein like reference characters refer to corresponding parts throughout the several views of the preferred embodiment of the invention and wherein.

SUMMARY OF THE INVENTION

Figure 1:
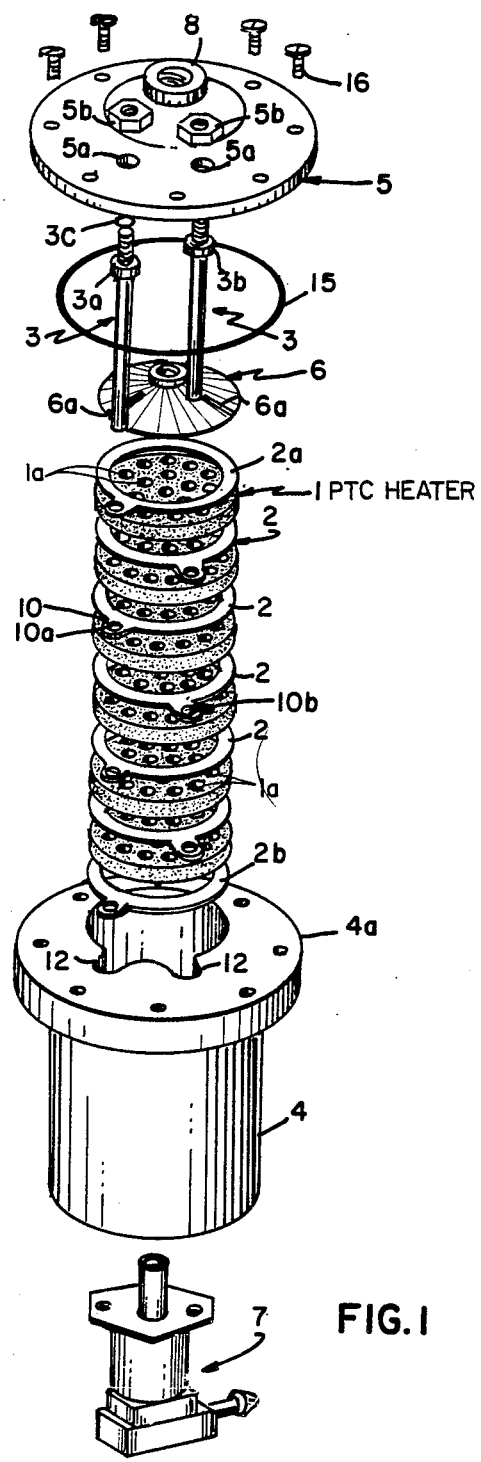
FIG. 1 is an exploded elevational view of the fuel heater of the present invention and FIG. 2 is an elevational view, partially in cross section, of the fuel heater shown in FIG. 1.

The fuel heater shown in FIG. 1 contains six positive temperature coefficient thermistor elements (PTC heaters) 1 arranged in a stack formation. These PTC heaters 1 are foraminous and the individual holes in them are preferably axially aligned with each other so as to enable the fuel to flow freely therethrough without significant obstruction. A series of conductive spacer elements 2 are disposed between adjacent PTC heaters in the stack. Each conductive spacer element 2 is arranged to contact opposing faces of the adjacent PTC heater. The top-most conductive spacer element 2a and the bottom-most PTC heater 2b is disposed against only one side of the PTC heater adjacent to it so that alternate sides of each PTC heater are connected to opposite sides of a power supply. Each of the conductive spacer elements 2, 2a and 2b are preferably in the shape of a ring with an ear 10 extending from the perimeter thereof. An aperture 10a or 10b is disposed in the ear 10 so as to receive a conductive post 3. As shown in the drawings, alternate conductive spacers 2, 2a and 2b, are staggered so as to form two series of ears 10. The apertures 10a in the first series of ears are aligned on one longitudinally extending axis and the apertures 10b on the other series of ears are aligned on a second longitudinally extending axis. Each of the axes is parallel to the axis of the stack of PTC heaters. One set of ears is arranged to be connected to the positive side of the power supply and the other set is arranged to be connected to the negative side of the power supply.

The stack of PTC heaters is disposed within a container 4 of the fuel heater. The container 4 is preferably formed of an electrical insulating material or at least formed with an electrically inert lining on the interior thereof. A pair of channels 12 are disposed on the inner wall of the container 4 and arranged to receive the ears 10 of the conductive spacer elements and to hold them in the two series mentioned above.

When the PTC heaters 1 and the conductive spacer elements 2, 2a and 2b, are disposed in the container 4, a plastic spacer 6 formed in a funnel shape with springy separators 6a is placed against the top-most conductive spacer element 2a. When the cover 5 is fitted in place, it urges against the top of the funnel and the pressure from the springy configuration urges the conductive spacers 2 (V:2. 2a and 2b) against the respective PTC heaters so as to insure effective electrical contact.

A pair of electrical posts 3 are then inserted through apertures 10a and 10b in ears 10. Gasket 15 is disposed upon flange 4a and cover 5 is disposed upon it and attached thereto by means of threaded fasteners 16. Electrical posts 3 extend through apertures 5a in cover 5 and are bolted onto it. Flanges 3a and 3b urge against O-rings 3c which in turn urge against the inside of cover plate 5. Flanges 3a and 3b are seated between cover 5 and flange 4a. When bolt 5b is screwed upon the upwardly extended threaded portions of conductive posts 3, and cover 5 is seated in place, the conductive posts will be firmly held in the container. The exterior ends of conductive posts 3 are arranged to be connected to opposite sides of a power supply (not shown) so that current may be carried to the system to energize the PTC heaters.

The fuel is brought into the heater through a conventional injector 7 and is heated as it passes through a holes 1a and cames in contact with the PTC heaters 1. The PTC heaters are energized at 12 volts and will draw up to 1,000 watts depending upon the fuel temperature and the flow rate. PTC heaters are selected such that they will maintain a temperature of 170° C. and will draw more power if forced below that temperature. Other PTC heaters with different operating parameters can be utilized, as necessary, to provide heat necessary to vaporize the fuel being utilized in the engine. The fuel vapor will then be delivered to the carburetor through an outlet 8 in cover plate 5 by means of appropriate piping.

Figure 2:
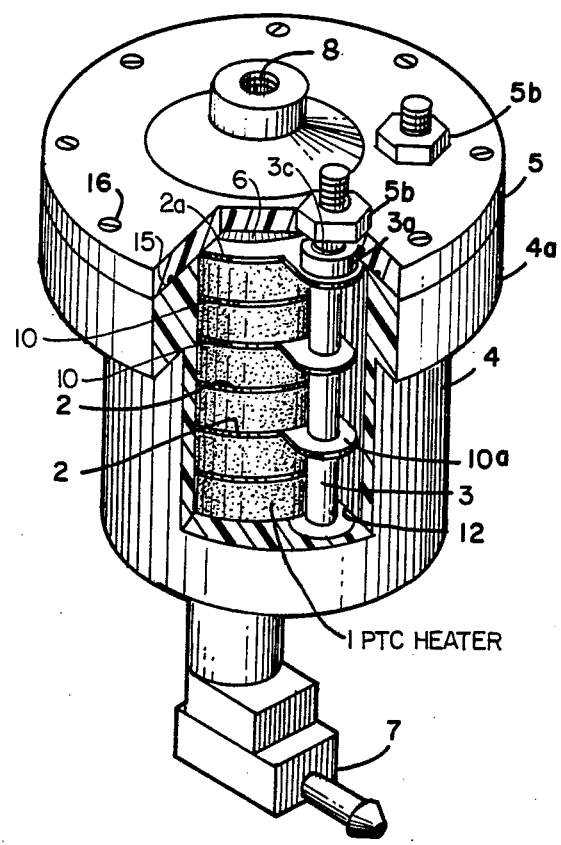

Referring now to FIG. 2, it can be seen that post 3 is disposed within channel 12 and arranged through holes 10a in ears 10. Flange 3a is held captive between flange 4a and cover 5. Foraminous PTC heaters 1 are arranged in a stack within container 4 with conductive spacers 2a interleafed between them. The top-most conductive spacer 2 is urged against PTC heater 1 by spring-like spacer 6. Cold fuel is injected into the container 4 thorough injector 7 and flows through the foraminous PTC heaters 1 (the holes 1a being shown in FIG. 1). The heated fuel emerges from outlet port 8. Conductive posts 3 are firmly seated within the container 4 through the use of nuts 5b that urge against the cover plate 5 and draw flanges 3a and 3b against them.

It is apparent that modification and changes can be made within the spirit and scope of the present invention but it is our intention, however, only to be limited by the scope of the appended claims.

As our invention we claim:
1. A fuel heater comprising:
   a container having an electrically insulated interior defining a fuel flow path and further having an inlet and an outlet, being connected to the opposite ends of said flow path for the passage of fuel therethrough; and
   a stack of generally planar foraminous PTC heaters disposed in said container in the flow path between the inlet and the outlet and arranged transversely of the flow direction of the flow of fuel; and
   an array of flat ring-like conductive elements, each having an electrical contact projecting from an edge thereof, the contact means of said array of elements being arranged in two rows, the electrical contact means in one row being arranged so as to be radially offset from the electrical contact means of the other row, each conductive element of each row being disposed between alternate PTC heaters in said stack, each of said conductive elements engaging substantially only the perimeter of the PTC heaters to leave the foraminous central portion thereof unobstructed to allow flow of fuel through said stack of PTC heaters from said inlet to said outlet; and a pair of radially offset channels disposed on the interior of said container; and electrical contact means of one row being disposed in one of said channels and electrical contact means of the other row being disposed in the other of said channels; and means connecting the outsides of the opposite end-most PTC heaters in the stack to the opposite sides of a power supply and means connecting the electrical contact means of said one row and the electrical contact means of said other row to opposite sides of the same power supply.

2. The fuel heater according to claim 1 wherein the electrical contact means each has an aperture disposed therein and said means for connecting said electrical contact means of each row comprises a post disposed in the apertures of each row of electrical contact means and in electrical contact therewith, said posts being connected to said opposite sides of said power supply.

3. The fuel heater according to claim 1 or 2 wherein said means to connect the opposite end-most PTC heater are also planar ring-like conductive elements, each having electrical contact means projecting from an edge thereof.

4. The fuel heater according to claim 1 further including a spring means engaging the outside of an end-most conductive element, whereby to urge the elements and the stack of PTC heaters against each other and to insure electrical contact.

5. The fuel heater according to claim 4, wherein one of said inlets and said outlet for said fuel flow path of said heater is in a cover closing an end of the fuel flow path in said container, and said spring means is conically shaped, and at least a portion thereof engaging said cover and the edges of the cone engaging the outer perimeter of an end-most conductive element, whereby to hold the PTC heater assembly in place in the container.

* * * * *